US011662753B2

(12) United States Patent
Birchfield et al.

(10) Patent No.: US 11,662,753 B2
(45) Date of Patent: May 30, 2023

(54) ELECTRONIC PLUMBING FIXTURE FITTING INCLUDING LEARNING SYSTEM AND REFERENCE SYSTEM

(71) Applicant: FB Global Plumbing Group LLC, North Olmsted, OH (US)

(72) Inventors: Jessica D. Birchfield, Cleveland, OH (US); Brian Patrick Frackelton, Macedonia, OH (US); George John Polly, Brecksville, OH (US)

(73) Assignee: Fortune Brands Water Innovations LLC, North Olmsted, OH (US)

( * ) Notice: Subject to any disclaimer, the term of this patent is extended or adjusted under 35 U.S.C. 154(b) by 425 days.

(21) Appl. No.: 16/858,037

(22) Filed: Apr. 24, 2020

(65) Prior Publication Data
US 2020/0341498 A1     Oct. 29, 2020

Related U.S. Application Data

(60) Provisional application No. 62/957,717, filed on Jan. 6, 2020, provisional application No. 62/838,004, filed on Apr. 24, 2019.

(51) Int. Cl.
  *G05D 23/19*     (2006.01)
  *E03C 1/04*      (2006.01)
  *G05D 23/20*     (2006.01)

(52) U.S. Cl.
  CPC .......... *G05D 23/1917* (2013.01); *E03C 1/04* (2013.01); *G05D 23/20* (2013.01)

(58) Field of Classification Search
  CPC .... E03C 1/041; E03C 2001/0418; E03C 1/04; G05D 23/1917
  (Continued)

(56) References Cited

U.S. PATENT DOCUMENTS 4,713,525 A * 12/1987 Eastep ................. F24H 9/2028
                                                       219/486
4,854,499 A *  8/1989 Neuman .................. E03C 1/04
                                                        4/615
(Continued)

FOREIGN PATENT DOCUMENTS

JP        2011058213 A     3/2011

OTHER PUBLICATIONS

International Search Report for International App. No. PCT/US2020/029846 dated Jul. 21, 2020 (2 pages).
(Continued)

*Primary Examiner* — Benjamin R Shaw
(74) *Attorney, Agent, or Firm* — Calfee, Halter & Griswold LLP

(57) ABSTRACT

The present invention provides an electronic plumbing fixture fitting including a learning system and a reference system. The electronic plumbing fixture fitting includes a user input module and a processor. The user input module includes a mechanism to receive from the user numerical value(s) of parameter(s) for water to be delivered through a discharge outlet of the electronic plumbing fixture fitting (e.g., a temperature) and a mechanism to deliver to the user the numerical value(s) of the parameter(s) via the water delivered through the discharge outlet of the electronic plumbing fixture fitting. Additionally, the processor includes a mechanism to learn a range of the numerical value(s) of the parameter(s) from a minimum value of the parameter to a maximum value of the parameter (e.g., from a lowest achievable temperature to a highest achievable temperature).

15 Claims, 4 Drawing Sheets

(58) Field of Classification Search
USPC .......................................................... 4/678
See application file for complete search history.

(56) References Cited

U.S. PATENT DOCUMENTS

| | | | |
|---|---|---|---|
| 5,244,148 A * | 9/1993 | Vandermeyder ... | G05D 23/1917 165/238 |
| 5,944,255 A * | 8/1999 | Shirmohamadi ......... | E03C 1/04 4/677 |
| 8,316,883 B1 * | 11/2012 | Watson ................. | E03C 1/0404 137/551 |
| 9,010,377 B1 | 4/2015 | O'Brien et al. | |
| 9,194,110 B2 | 11/2015 | Frick et al. | |
| 9,212,473 B2 | 12/2015 | Baker et al. | |
| 9,758,951 B2 | 9/2017 | Evans et al. | |
| 9,828,751 B2 | 11/2017 | Parikh et al. | |
| 9,976,290 B2 | 5/2018 | Evans et al. | |
| 10,036,149 B2 * | 7/2018 | Wallerstorfer ............ | H02P 8/22 |
| 10,081,931 B2 * | 9/2018 | Song ................... | F16K 27/0263 |
| 10,274,971 B2 | 4/2019 | Song | |
| 10,392,786 B2 | 8/2019 | Lance et al. | |
| 10,557,254 B2 | 2/2020 | Song | |
| 2003/0233885 A1 * | 12/2003 | Bird ...................... | G01F 15/003 73/861 |
| 2005/0236493 A1 * | 10/2005 | Lin ....................... | F16K 37/005 236/94 |
| 2011/0186135 A1 * | 8/2011 | Hanna ...................... | E03C 1/05 137/1 |
| 2012/0118989 A1 * | 5/2012 | Buescher ................ | F24H 1/202 236/51 |
| 2013/0248033 A1 | 9/2013 | Parikh et al. | |
| 2013/0291978 A1 * | 11/2013 | Baker ...................... | E03C 1/04 137/801 |
| 2013/0333764 A1 * | 12/2013 | Wright ................... | E03C 1/0408 137/551 |
| 2014/0142729 A1 * | 5/2014 | Lobb ....................... | G06F 3/017 700/90 |
| 2014/0261780 A1 * | 9/2014 | Thomas ................... | E03C 1/057 137/801 |
| 2016/0076233 A1 | 3/2016 | Parikh et al. | |
| 2016/0077530 A1 * | 3/2016 | Moran ..................... | E03C 1/055 700/282 |
| 2016/0208946 A1 | 7/2016 | Moghe et al. | |
| 2016/0208947 A1 | 7/2016 | Song et al. | |
| 2016/0208948 A1 | 7/2016 | Wallerstorfer | |
| 2016/0334807 A1 * | 11/2016 | Song ..................... | G05D 7/0635 |
| 2017/0268208 A1 * | 9/2017 | LaMarche .......... | G05D 23/1393 |
| 2017/0350103 A1 * | 12/2017 | Lee ........................... | A47K 3/28 |
| 2018/0148912 A1 * | 5/2018 | Park ....................... | E03C 1/055 |
| 2018/0291600 A1 * | 10/2018 | Beck ...................... | G06F 3/016 |
| 2019/0338502 A1 * | 11/2019 | Baker ................... | F16K 19/006 |
| 2020/0123746 A1 | 4/2020 | Frackelton | |
| 2020/0123747 A1 * | 4/2020 | Frackelton ......... | G05D 23/1393 |
| 2020/0173152 A1 | 6/2020 | Song | |
| 2020/0347583 A1 * | 11/2020 | Obrist ..................... | E03C 1/057 |

OTHER PUBLICATIONS

Written Opinion of the International Searching Authority for International App. No. PCT/US2020/029846 dated Jul. 21, 2020 (14 pages).

* cited by examiner

Figure 4a

Please select your temperature

| | |
|---|---|
| 110 °F | |
| 109 °F | Water Heater Max |
| 108 °F | |
| 107 °F | My After-Workout Shower Temp |
| 106 °F | |
| 105 °F | |
| 104 °F | |
| 103 °F | Your Last Shower |
| 102 °F | |
| 101 °F | |
| 100 °F | Avg Shower Temp |

Figure 4b

Please select your temperature

| | |
|---|---|
| 54 °F | |
| 53 °F | Lowest Summer Temp |
| 52 °F | |
| 51 °F | Lowest Recent Temp |
| 50 °F | |
| 49 °F | |
| 48 °F | |
| 47 °F | |
| 46 °F | |
| 45 °F | Lowest Winter Temp |
| 44 °F | |

ELECTRONIC PLUMBING FIXTURE FITTING INCLUDING LEARNING SYSTEM AND REFERENCE SYSTEM

CROSS-REFERENCE TO RELATED APPLICATIONS

This application claims the benefit of U.S. Provisional Application No. 62/838,004, filed Apr. 24, 2019, and U.S. Provisional Application No. 62/957,717, filed Jan. 6, 2020, the entire disclosures of which are hereby incorporated by reference.

FIELD

The present invention relates generally to an electronic plumbing fixture fitting and, more particularly, to an electronic plumbing fixture fitting, such as an electronic faucet, including a learning system and a reference system

BACKGROUND

Electronic plumbing fixture fittings, such as electronic faucets, are well known. Such electronic plumbing fixture fittings are used in residential and commercial applications, such as in kitchens and various other locations. Users desire to use electronic plumbing fixture fittings. Many difficulties can be encountered in using electronic plumbing fixture fittings.

SUMMARY

The present invention provides an electronic plumbing fixture fitting including a learning system and a reference system.

In an exemplary embodiment, the electronic plumbing fixture fitting comprises a discharge outlet, an electronic valve, a user input module, a water sensor, and a processor. The discharge outlet is operable to deliver water. The electronic valve is operable to permit flow of water through the discharge outlet when the electronic valve is activated and to not permit flow of water through the discharge outlet when the electronic valve is deactivated. The electronic valve is operable to control a parameter of water flowing through the discharge outlet. The user input module is operable to communicate with a user regarding a desired value of the parameter of water and an achievable value of the parameter of water. The water sensor is operable to detect a value of the parameter of water. The processor is operable to communicate with each of the electronic valve, the user input module, and the water sensor regarding at least one of the desired value of the parameter, the achievable value of the parameter, and the detected value of the parameter. The processor is operable to send a signal to the electronic valve to activate and flow at least one of a minimum value of the parameter of water and a maximum value of the parameter of water. The electronic valve is operable to receive the signal from the processor and to activate and flow at least one of the minimum value of the parameter and the maximum value of the parameter. The water sensor is operable to detect the value of the parameter and to send a signal to the processor indicating the detected value of the parameter. The processor is operable to receive the signal from the water sensor indicating the detected value of the parameter and, if the electronic valve is flowing the minimum value of the parameter, the detected value is saved as a lowest achievable value of the parameter, and if the electronic valve is flowing the maximum value of the parameter, the detected value is saved as a highest achievable value of the parameter.

In an exemplary embodiment, the electronic plumbing fixture fitting comprises a discharge outlet, an electronic valve, a user input module, a water sensor, and a processor. The discharge outlet is operable to deliver water. The electronic valve is operable to permit flow of water through the discharge outlet when the electronic valve is activated and to not permit flow of water through the discharge outlet when the electronic valve is deactivated. The electronic valve is operable to control a parameter of water flowing through the discharge outlet. The user input module is operable to communicate with a user regarding a desired value of the parameter of water and an achievable value of the parameter of water. The user input module is operable to receive instruction from the user regarding the desired value of the parameter. The water sensor is operable to detect a value of the parameter of water. The processor is operable to communicate with each of the electronic valve, the user input module, and the water sensor regarding at least one of the desired value of the parameter, the achievable value of the parameter, and the detected value of the parameter. The processor is operable to send a signal to the electronic valve to activate and flow at least one of a minimum value of the parameter of water and a maximum value of the parameter of water. The electronic valve is operable to receive the signal from the processor and to activate and flow at least one of the minimum value of the parameter and the maximum value of the parameter. The water sensor is operable to detect the value of the parameter of water and to send a signal to the processor indicating the detected value of the parameter. The processor is operable to receive the signal from the water sensor indicating the detected value of the parameter and, if the electronic valve is flowing the minimum value of the parameter, the detected value is saved as the lowest achievable value of the parameter, and if the electronic valve is flowing the maximum value of the parameter, the detected value is saved as the highest achievable value of the parameter. The user input module is operable to receive an instruction from the user to deliver water at the desired value of the parameter and to send a signal to the processor indicating the desired value. The processor is operable to receive the signal from the user input module indicating the desired value of the parameter and to determine whether the desired value is achievable. If the desired value is achievable, the processor is operable to send a signal to the electronic valve to control the parameter of water and the electronic valve is operable to receive the signal from the processor to control the parameter of water and to adjust the parameter of water flowing through the discharge outlet. If the desired value is not achievable, the processor is operable to send a signal to the user input module indicating the lowest achievable value of the parameter or the highest achievable value of the parameter and the user input module is operable to receive the signal from processor indicating the lowest achievable value or the highest achievable value, to notify the user that the desired value is not achievable, and to provide the lowest achievable value or the highest achievable value to the user.

In an exemplary embodiment, the electronic plumbing fixture fitting comprises a discharge outlet, an electronic valve, a user input module, and a processor. The discharge outlet is operable to deliver water. The electronic valve is operable to permit flow of water through the discharge outlet when the electronic valve is activated and to not permit flow of water through the discharge outlet when the electronic valve is deactivated. The electronic valve is operable to control a parameter of water flowing through the discharge outlet. The user input module is operable to communicate with a user regarding potential values of the parameter of water and a desired value of the parameter of water. The user input module includes an electronic input device. The electronic input device is operable to display to the user the potential values of the parameter and to receive from the user the desired value of the parameter. The processor is operable to communicate with each of the electronic valve and the electronic input device regarding at least one of the potential values of the parameter and the desired value of the parameter. The electronic input device is operable to display to the user a range of potential values of the parameter and a reference descriptor for at least one of the potential values of the parameter. The electronic input device is operable to receive an instruction from the user to deliver water at the desired value of the parameter and to send a signal to the processor indicating the desired value of the parameter. The processor is operable to receive the signal from the electronic input device indicating the desired value of the parameter and to send a signal to the electronic valve to control the parameter of water. The electronic valve is operable to receive the signal from the processor to control the parameter of water and to adjust the parameter of water flowing through the discharge outlet.

BRIEF DESCRIPTION OF THE DRAWINGS

FIGS. 4a and 4b are illustrations of a user input module displaying information relating to a reference system of an electronic plumbing fixture fitting according to an exemplary embodiment of the present invention.

DETAILED DESCRIPTION

The present invention provides an electronic plumbing fixture fitting. In an exemplary embodiment, the electronic plumbing fixture fitting is an electronic faucet. However, one of ordinary skill in the art will appreciate that the electronic plumbing fixture fitting could be an electronic showering system, an electronic showerhead, an electronic handheld shower, an electronic body spray, an electronic side spray, or any other electronic plumbing fixture fitting.

Figure 1:
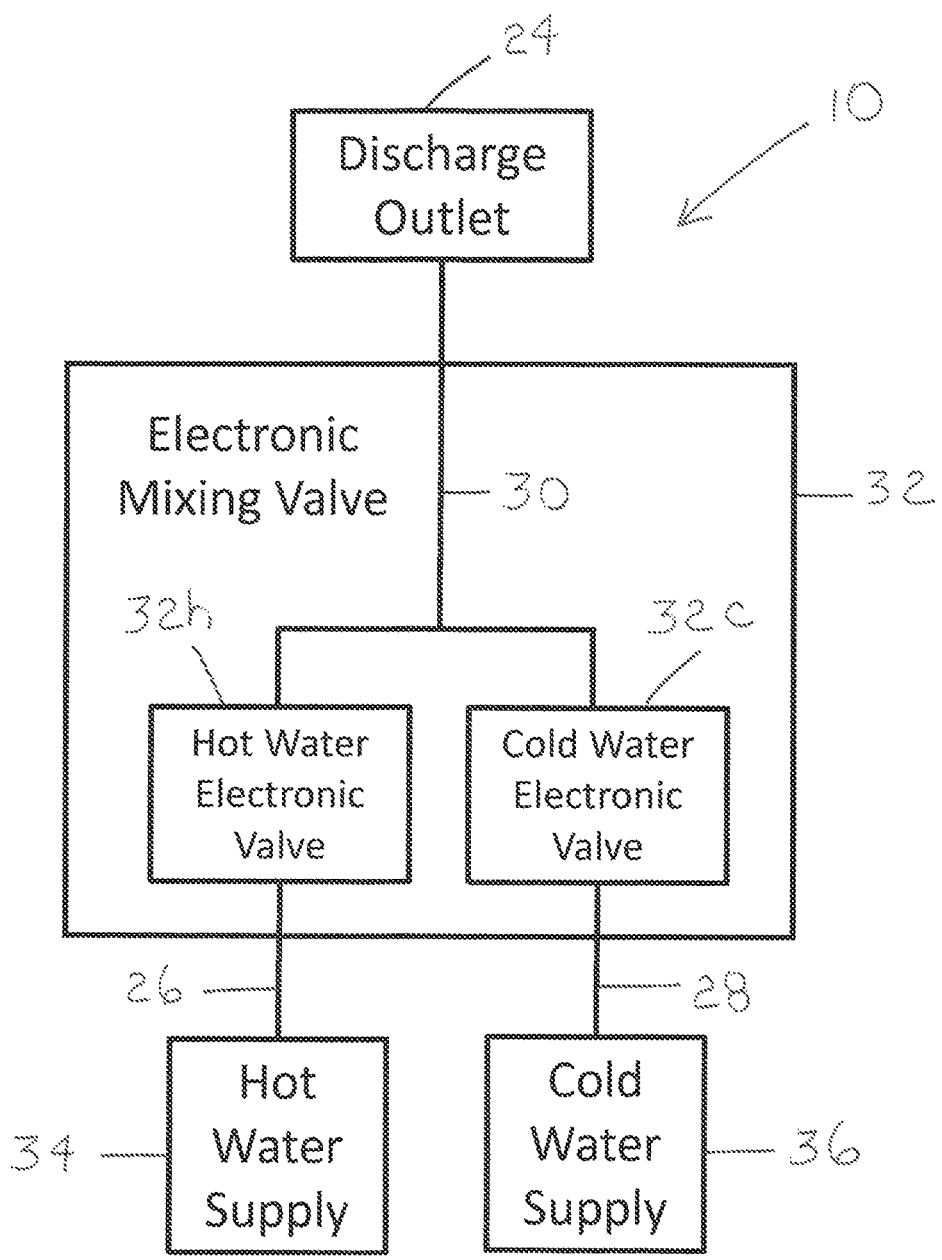
FIG. 1 is a schematic illustration of fluidic components of an electronic plumbing fixture fitting according to an exemplary embodiment of the present invention.
Figure 2:
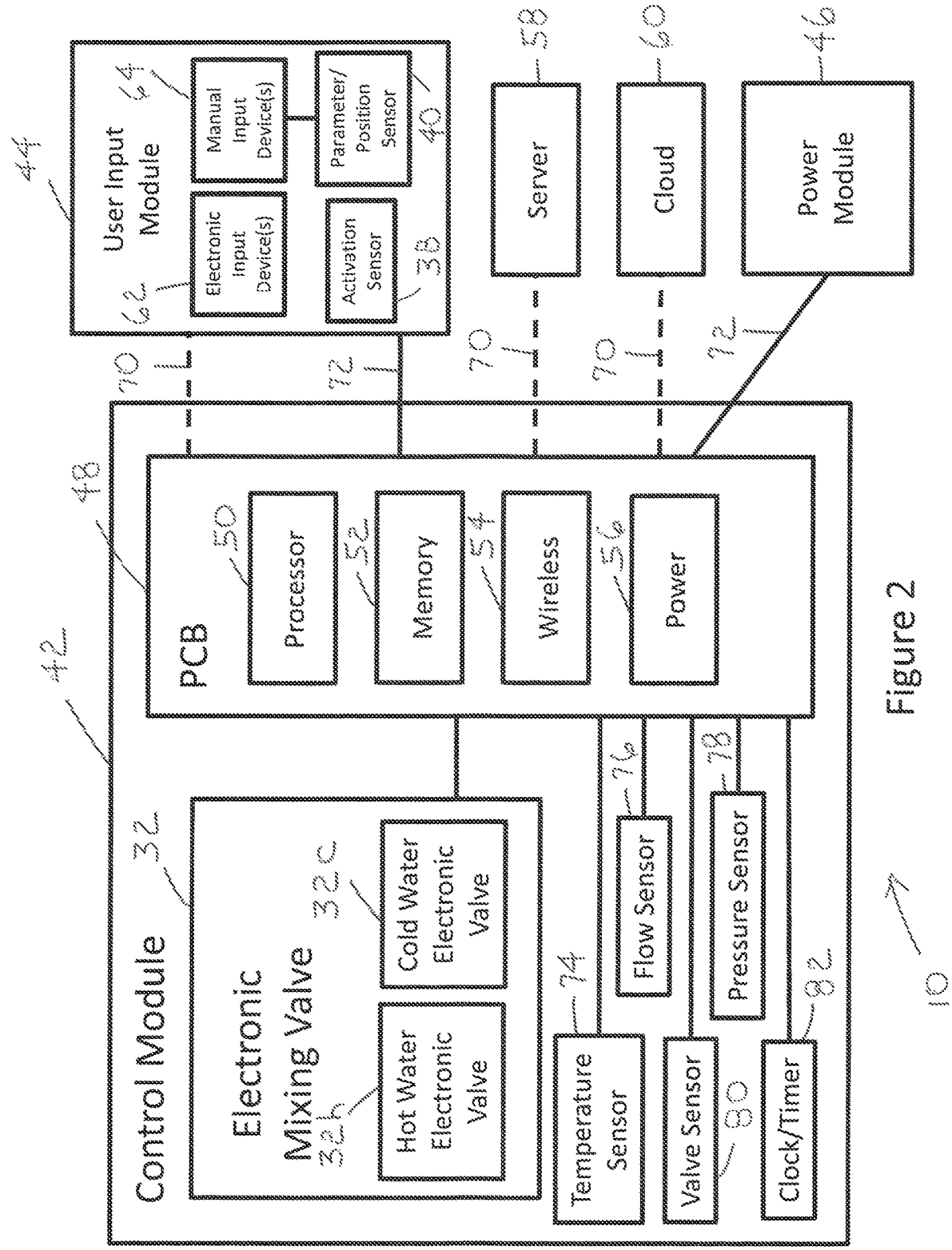
FIG. 2 is a schematic illustration of electrical/electronic components of an electronic plumbing fixture fitting according to an exemplary embodiment of the present invention.
Figure 3:
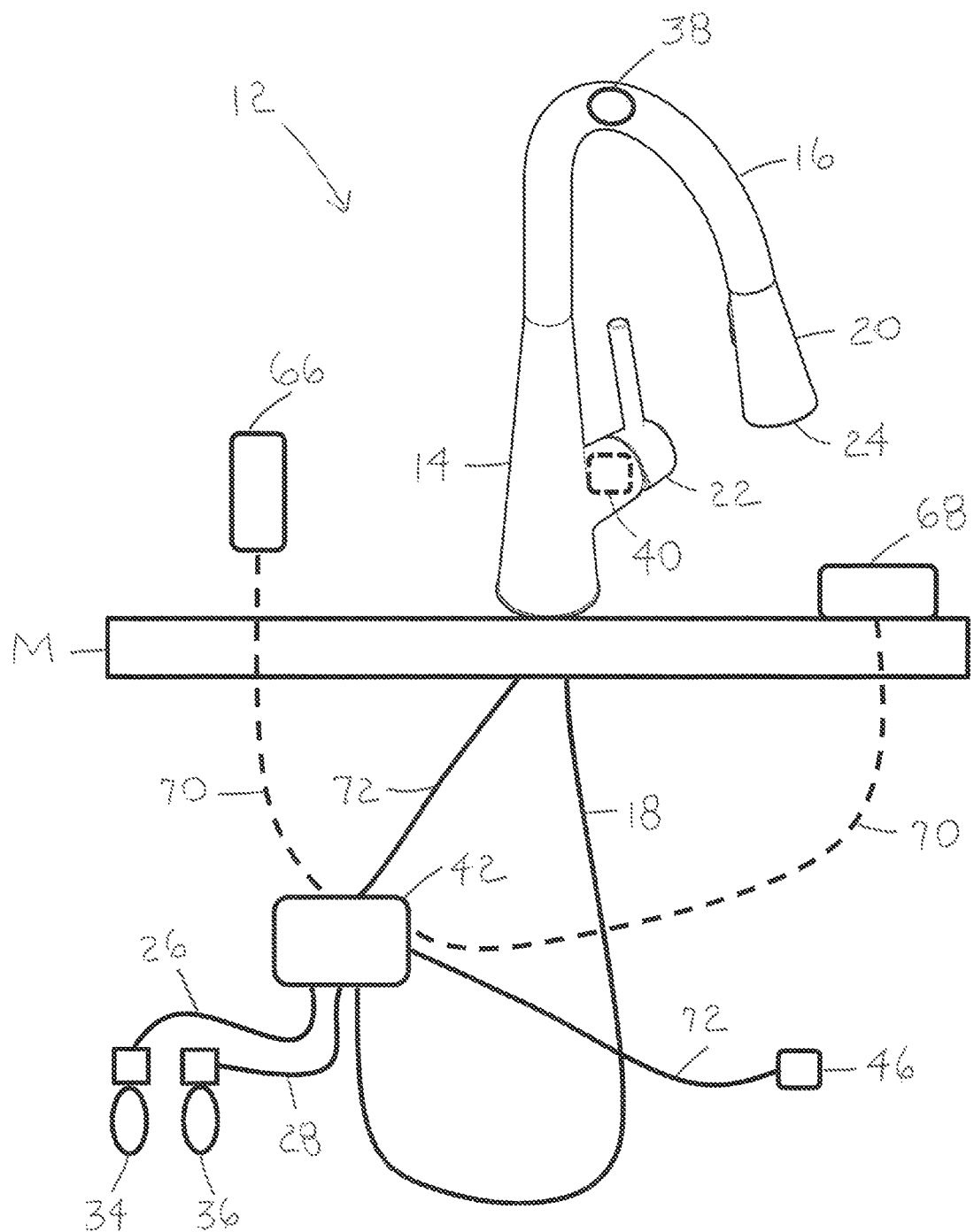
FIG. 3 is an illustration of an electronic faucet according to an exemplary embodiment of the present invention.

An exemplary embodiment of an electronic plumbing fixture fitting 10, such as an electronic faucet 12, is illustrated in FIGS. 1 and 2. FIG. 1 primarily shows the fluidic components and connections of the electronic plumbing fixture fitting 10, and FIG. 2 primarily shows the electrical/electronic components and connections of the electronic plumbing fixture fitting 10. An exemplary embodiment of the electronic faucet 12 is illustrated in FIG. 3. FIG. 3 shows the fluidic and electrical/electronic components of the electronic faucet 12.

In the illustrated embodiments, as best shown in FIG. 3, the faucet 12 includes a hub 14, a spout 16, a wand hose 18, a wand 20, and a handle 22. An upstream end of the hub 14 is connected to a mounting surface M (such as a counter or sink). An upstream end of the spout 16 is connected to a downstream end of the hub 14. The spout 16 is operable to rotate relative to the hub 14. The wand hose 18 extends through the hub 14 and the spout 16 and is operable to move within the hub 14 and the spout 16. An upstream end of the wand 20 is mounted in a downstream end of the spout 16 and is connected to a downstream end of the wand hose 18. A downstream end of the wand 20 includes a discharge outlet 24 through which water is delivered from the faucet 12. The wand 20 is operable to pull away from the spout 16. The handle 22 is connected to a side of the hub 14 and is operable to move relative to the hub 14. Although the faucet 12 has been described as having a rotatable spout 16, a pull-out or pull-down wand 20, and a handle 22 mounted on the hub 14, one of ordinary skill in the art will appreciate that, in certain embodiments, the spout 16 could be fixed relative to the hub 14, the faucet 12 may not include a wand 20, the handle 22 could be mounted on other locations on the faucet 12 or remote from the faucet 12, the faucet 12 could include more than one handle 22, the handle 22 could be any mechanical actuation device or user interface, and/or the faucet 12 may not include a handle 22.

Additionally, in the illustrated embodiments, as best shown in FIGS. 1 and 3, the fitting 10 and the faucet 12 include a hot water line 26, a cold water line 28, a mixed water line 30, and an electronic valve 32. In the illustrated embodiments, the electronic valve 32 is an electronic mixing valve that includes a hot water electronic valve 32h and a cold water electronic valve 32c.

An upstream end of the hot water line 26 connects to a hot water supply 34, and an upstream end of the cold water line 28 connects to a cold water supply 36. A downstream end of the hot water line 26 connects to the electronic valve 32, and a downstream end of the cold water line 28 connects to the electronic valve 32. More particularly, a downstream end of the hot water line 26 connects to the hot water electronic valve 32h, and a downstream end of the cold water line 28 connects to the cold water electronic valve 32c.

An upstream end of the mixed water line 30 connects to the electronic valve 32. More particularly, an upstream end of the mixed water line 30 connects to the hot water electronic valve 32h and the cold water electronic valve 32c. A downstream end of the mixed water line 30 connects to the discharge outlet 24. In the illustrated embodiments, at least a portion of the mixed water line 30 is the wand hose 18. As stated above, the downstream end of the wand hose 18 connects to the upstream end of the wand 20, and the downstream end of the wand 20 includes the discharge outlet 24 through which water is delivered from the faucet 12.

In the illustrated embodiments, each portion of the hot water line 26, the cold water line 28, and the mixed water line 30 is shown as including at least one hose, pipe, or passage. However, one of ordinary skill in the art will appreciate that each portion of the hot water line 26, the cold water line 28, and the mixed water line 30 could include more than one hose, pipe, or passage. Similarly, each portion of the hot water line 26, the cold water line 28, and the mixed water line 30 could include a combination of hose(s), pipe(s), and/or passage(s). In an exemplary embodiment, the hoses are flexible hoses. However, one of ordinary skill in the art will appreciate that other types of hoses could be used. If a portion of the hot water line 26, the cold water line 28, or the mixed water line 30 includes more than one hose, pipe, and/or passage, the hose(s), pipe(s), and/or passage(s) are connected via connectors. In an exemplary embodiment for the flexible hoses, the connectors are push-fit connectors. However, one of ordinary skill in the art will appreciate that other types of connectors could be used.

When reference is made to one component of the fitting 10 or the faucet 12 connecting to another component of the fitting 10 or the faucet 12, the connection may be direct or indirect. One of ordinary skill in the art will appreciate that additional components may be needed if the connection is indirect.

In the illustrated embodiments, the fitting 10 and the faucet 12 include the electronic valve 32 and, more particularly, the hot water electronic valve 32$h$ and the cold water electronic valve 32$c$. However, one of ordinary skill in the art will appreciate that the fitting 10 and the faucet 12 could include one or more electronic valves. Additionally, the fitting 10 and the faucet 12 could include one or more mechanical valves, either in parallel or in series with the electronic valve(s). Further, although the fitting 10 and the faucet 12 have been described as including the electronic valve 32 that is an electronic mixing valve, one of ordinary skill in the art will appreciate that the fitting 10 and the faucet 12 could include just the hot water electronic valve 32$h$ or just the cold water electronic valve 32$c$.

In an exemplary embodiment, the hot water electronic valve 32$h$ and the cold water electronic valve 32$c$ are proportional valves and, more specifically, stepper motor actuated valves. However, one of ordinary skill in the art will appreciate that the hot water electronic valve 32$h$ and the cold water electronic valve 32$c$ could be any type of electronic valves, including, but not limited to, solenoid valves and electronic throttle valves.

In the illustrated embodiments, as best shown in FIG. 3, the fitting 10 and the faucet 12 includes an activation sensor 38, such as a toggle sensor. In an exemplary embodiment, the activation sensor 38 is a proximity sensor and, in particular, an infrared sensor. The activation sensor 38 is also referred to as a latching sensor and a sustained-flow sensor. In the illustrated embodiment, the activation sensor 38 is mounted on an apex of the spout 16. The activation sensor 38 defines an activation zone. In an exemplary embodiment, the activation sensor 38 is operable to activate the hot water electronic valve 32$h$ and the cold water electronic valve 32$c$ when an object enters the activation zone and to deactivate the hot water electronic valve 32$h$ and the cold water electronic valve 32$c$ when the object exits and reenters the activation zone. As used herein, an "object" can be any portion of a user's body or any item used by the user to trigger the activation sensor 38. In an exemplary embodiment, the activation zone extends generally upwardly from the activation sensor 38. Additionally, in an exemplary embodiment, the activation zone has a generally cone-like shape.

As described above, the activation sensor 38 is a proximity sensor and, in particular, an infrared sensor. Proximity sensors are sensors that detect the presence of an object without any physical contact. However, one of ordinary skill in the art will appreciate that the activation sensor 38 could be any type of electronic sensor that can be triggered, including, but not limited to, other proximity sensors, touch sensors, and image sensors. Exemplary electronic sensors include, but are not limited to, electromagnetic radiation sensors (such as optical sensors and radar sensors), capacitance sensors, inductance sensors, piezo-electric sensors, and multi-pixel optical sensors (such as camera sensors). As further described above, the activation sensor 38 is mounted on the apex of the spout 16. However, one of ordinary skill in the art will appreciate that the activation sensor 38 could be mounted in any location on the faucet 12 or in a location remote from the faucet 12.

Similarly, as described above, the activation sensor 38 is a toggle sensor. However, one of ordinary skill in the art will appreciate that the activation sensor 38 could be any type of sensor that provides information useful in determining whether to activate or deactivate the hot water electronic valve 32$h$ and the cold water electronic valve 32$c$, including, but not limited to, flow sensors, pressure sensors, temperature sensors, and position sensors.

In the illustrated embodiments, the handle 22 operates as it would with a standard faucet. In other words, the handle 22 can be moved between various positions to indicate a desired temperature, flow rate, and/or volume of water discharged from the faucet 12.

In the illustrated embodiments, as best shown in FIG. 3, although the handle 22 does not control a mechanical valve, the handle 22 operates as it would with a standard faucet. In other words, the handle 22 can be moved between various positions to indicate a desired temperature, flow rate, and/or volume of water discharged from the faucet 12.

More specifically, with regard to the temperature of water, the handle 22 can be rotated about a longitudinal axis of a side opening in the hub 14. At one extent of a range of rotation, the position of the handle 22 indicates all hot water (a full hot position). At the other extent of the range of rotation, the position of the handle 22 indicates all cold water (a full cold position). In between the extents of the range of rotation, the position of the handle 22 indicates a mix of hot and cold water (mixed temperature positions) with hotter temperature water as the position nears the full hot extent of the range of rotation and colder temperature water as the position nears the full cold extent of the range of rotation.

With regard to the flow rate/volume of water, the handle 22 can be moved toward and away from the side opening in the hub 14. At one extent of a range of movement, the position of the handle 22 indicates no flow rate/volume of water (a full closed position). At the other extent of the range of movement, the position of the handle 22 indicates full flow rate/volume of water (a full open position). In between the extents of the range of movement, the position of the handle 22 indicates an intermediate flow rate/volume of water (less than full open positions) with reduced flow rate/volume of water as the position nears the full closed extent of the range of movement and increased flow rate/volume of water as the position nears the full open extent of the range of movement.

In an exemplary embodiment, the faucet 12 is operable to detect movement of the handle 22 and to provide information to set at least one parameter of water flowing through the hot water electronic valve 32$h$ and the cold water electronic valve 32$c$ based on the movement of the handle 22. The faucet 12 is operable to detect movement of the handle 22 either directly or indirectly. In an exemplary embodiment, based on the movement of the handle 22, the faucet 12 provides information to set a temperature, flow rate, and/or volume of water flowing through the hot water electronic valve 32$h$ and the cold water electronic valve 32$c$.

Further, in the illustrated embodiments, as best shown in FIG. 3, the faucet 12 includes a parameter or position sensor 40. In an exemplary embodiment, the parameter or position sensor 40 is operable to detect a state of the handle 22, such as a position or a movement of the handle 22, and to provide information to set at least one parameter of water flowing through the hot water electronic valve 32$h$ and the cold water electronic valve 32$c$ based on the state of the handle 22, such as the position or the movement of the handle 22. The parameter or position sensor 40 is operable to detect the state of the handle 22, such as the position or the movement of the handle 22, ranging from the full hot position through the full cold position and from the full closed position through the full open position. The parameter or position sensor 40 is operable to detect the state of the handle 22, such as the position or the movement of the handle 22, either directly or indirectly. In an exemplary embodiment, based on the state of the handle 22, such as the position or the movement of the handle 22, the parameter or position sensor 40 provides information to set a temperature, flow rate, and/or volume of water flowing through the hot water electronic valve 32h and the cold water electronic valve 32c.

An electronic plumbing fixture fitting, such as an electronic faucet, including a parameter or position sensor that is operable to detect movement of a handle and to provide information to set at least one parameter (such as a temperature and/or a volume) of water flowing through a hot water electronic valve and a cold water electronic valve based on movement of the handle is disclosed in U.S. Pat. No. 9,212,473, assigned to FB Global Plumbing Group LLC, the entire disclosure of which is hereby incorporated by reference.

Further, in the illustrated embodiments, as best shown in FIGS. 2 and 3, the fitting 10 and the faucet 12 include a control module 42, a user input module 44, and a power module 46.

The flow components of the control module 42 include a number of inlets and outlets and a number of flow passages. These inlets/outlets and flow passages enable the easy management of the flow between the incoming flows (i.e., the hot water line 26 and the cold water line 28) and the outgoing flow (i.e., the mixed water line 30 or the wand hose 18).

In the illustrated embodiments, as best shown in FIG. 3, the control module 42 is operable to mount below the mounting surface M (such as the counter or sink). In an exemplary embodiment, the control module 42 is operable to mount on a mounting shank of the fitting 10 or the faucet 12. In the illustrated embodiments, the electronic valve 32 is located inside the control module 42. In the illustrated embodiments, the control module 42 includes a top or first side and a bottom or second side. The first side is opposite the second side. In the illustrated embodiments, the second side includes openings for hoses and flow passages.

In the illustrated embodiments, as best shown in FIG. 2, the control module 42 further includes a number of electronic components. These components enable the operation of the fitting 10 or the faucet 12. More specifically, these components enable the activation, deactivation, and control of the electronic valve 32 through user input. The control module 42 includes the electronic valve 32 and a printed circuit board ("PCB") 48. In the illustrated embodiments, a number of electronic components are mounted on the PCB 48, including, but not limited to, a processor 50, memory 52, a wireless communication chip 54, and a power port 56. The processor 50 receives signals from and sends signals to the components of the fitting 10 or the faucet 12 to control operation of the fitting 10 or the faucet 12. For example, the processor 50 receives signals from sensors (described above and to be described in greater detail below) and sends signals to the electronic valve 32 to activate, deactivate, and control the electronic valve 32. The memory 52 can save information received from the components of the fitting 10 or the faucet 12. The information can also be saved in remote memory. Exemplary storage locations for the remote memory include the user input module 44 (where the user input module 44 includes memory, such as an Apple iPhone and a Google Android phone), a centralized server provided by the fitting/faucet manufacturer, and a cloud service provided by the fitting/faucet manufacturer or a third party (such as Google, HomeKit, and IFTTT). In the illustrated embodiments, the remote memory includes a server 58 and a cloud 60.

In the illustrated embodiments, as best shown in FIGS. 2 and 3, the user input module 44 provides operational instructions to the electronic components of the fitting 10 or the faucet 12. The user input module 44 can be any module that enables user input. The user input module 44 includes electronic input device(s) 62 and manual input device(s) 64. Exemplary electronic input devices 62 include activation sensors, mobile devices, voice controlled devices, touch screen devices, and push button devices. In the illustrated embodiments, the user input module 44 includes the activation sensor 38, a mobile device 66, and a voice controlled device 68. Exemplary manual input devices 64 include handles and joysticks. In the illustrated embodiments, the user input module 44 includes the handle 22. The user input module 44 receives input from a user and sends signals to the control module 42 or other electronic components of the fitting 10 or the faucet 12 to control operation of the components of the fitting 10 or the faucet 12. For example, the user input module 44 receives input from a user and sends signals to the processor 50 to activate, deactivate, and control the electronic valve 32.

In the illustrated embodiments, some components of the user input module 44 (e.g., the mobile device 66 and the voice controlled device 68) are connected to the control module 42 via a wireless communication connection 70 (such as a Wi-Fi connection), while other components of the user input module 44 (e.g., the activation sensor 38 and the parameter or position sensor 40) are connected to the control module 42 via a hard-wired connection 72. In the illustrated embodiments, some components of the user input module 44 (e.g., the mobile device 66 and the voice controlled device 68) send the signals to and/or receive signals from the processor 50 via the wireless communication connection 70 (such as the Wi-Fi connection), while other components of the user input module 44 (e.g., the activation sensor 38 and the parameter or position sensor 40) send signals to and/or receive signals from the processor 50 via the hard-wired connection 72. However, one of ordinary skill in the art will appreciate that each component of the user input module 44 could be connected to the control module 42 and send signals to and/or receive signals from the processor 50 via any type of connection, including other wireless communication connections, such as Bluetooth, cellular, near field communication (NFC), Zigbee, and Z-Wave, or a hard-wired connection.

In the illustrated embodiments, as best shown in FIG. 3, three electronic input devices 62 and one manual input device 64 are shown, i.e., the activation sensor 38 on the faucet 12, the mobile device 66 that can be held or moved by the user, the voice controlled device 68 located on the mounting surface M, and the handle 22 connected to the hub 14 of the faucet 12 located on the mounting surface M. However, one of ordinary skill in the art will appreciate that the user input module 44 could include any number of components. Moreover, each component of the user input module 44 could be in any location where it can send signals to and/or receive signals from the control module 42 and/or other electronic components of the fitting 10 or the faucet 12, such as the processor 50, or each component of the user input module 44 could be integrally formed with or physically connected to the fitting 10 or the faucet 12.

In the illustrated embodiments, as best shown in FIGS. 2 and 3, the server 58 and the cloud 60 are connected to the control module 42 via the wireless communication connection 70 (such as the Wi-Fi connection).

In the illustrated embodiments, as best shown in FIGS. 2 and 3, the power module 46 provides power to the electrical/electronic components of the fitting 10 or the faucet 12. In the illustrated embodiments, the power module 46 is operable to mount below the mounting surface M. In the illustrated embodiments, the power module 46 is connected to the control module 42 via the hard-wired connection 72. In an exemplary embodiment, the power module 46 includes battery power. In an exemplary embodiment, the power module 46 includes AC power.

During operation of the electronic valve 32, the user activates, deactivates, and controls the electronic valve 32 using the user input module 44. When the user appropriately triggers the user input module 44, the electronic valve 32 is activated, deactivated, or otherwise controlled. For example, the user could trigger the user input module 44 by triggering the activation sensor 38, pressing an appropriate button on the mobile device 66, stating specific commands to the voice controlled device 68, and/or opening, closing, and/or moving the handle 22. For voice control, when the user says "turn on the faucet," the electronic valve 32 is activated. Similarly, when the user says "turn off the faucet," the electronic valve 32 is deactivated. Further, when the user says "increase temperature," "decrease temperature," "increase flow," or "decrease flow," the electronic valve 32 is controlled to accomplish the requested action. The commands can be predetermined. Additionally, the commands can be customizable. For example, the user could activate the electronic valve 32 by saying "start flow" instead of "turn on the faucet." Similarly, the user could deactivate the electronic valve 32 by saying "stop flow" instead of "turn off the faucet."

As used herein, "activate a valve" means to move the valve to or maintain the valve in an open position, regardless of the volume or temperature of the flowing water, and "deactivate a valve" means to move the valve to a completely closed position.

When reference is made to activating or deactivating the electronic valve 32 "when the user appropriately triggers the user input module 44," the electronic valve 32 may be activated or deactivated immediately upon the user input module 44 being triggered or a predetermined period of time after the user input module 44 has been triggered.

In the illustrated embodiments, the fitting 10 and the faucet 12 include sensors. In the illustrated embodiments, the sensors include the activation sensor 38, the parameter or position sensor 40, a temperature sensor 74, a flow sensor 76, a pressure sensor 78, and a valve sensor 80. The activation sensor 38 and the parameter or position sensor 40 were described above. The temperature sensor 74 is operable to detect a temperature of water in the hot water line 26, the cold water line 28, the electronic valve 32, and/or the mixed water line 30 or wand hose 18. The flow sensor 76 is operable to detect a flow rate of water in the hot water line 26, the cold water line 28, the electronic valve 32, and/or the mixed water line 30 or wand hose 18. The pressure sensor 78 is operable to detect a pressure of water in the hot water line 26, the cold water line 28, the electronic valve 32, and/or the mixed water line 30 or wand hose 18. The valve sensor 80 is operable to detect a position of the electronic valve 32 and/or a motor driving the electronic valve 32. The sensors send signals to the processor 50 indicating the detected information.

The information detected by the sensors is used to control the operation of the fitting 10 or the faucet 12. The information detected by the activation sensor 38 can be used to activate and deactivate the fitting 10 or the faucet 12. The information detected by the parameter or position sensor 40 can be used to determine a temperature, flow rate, and/or volume of water desired by the user. The information detected by the temperature sensor 74 can be used to maintain a temperature of water discharged from the fitting 10 or the faucet 12. The information detected by the flow sensor 76 can be used to determine if there is flow or maintain a flow rate of water discharged from the fitting 10 or the faucet 12. The information detected by the pressure sensor 78 can be used to maintain a pressure or determine a volume of water discharged from the fitting 10 or the faucet 12. The information detected by the valve sensor 80 can be used to open and close the electronic valve 32.

In the illustrated embodiments, the fitting 10 and the faucet 12 include a clock/timer 82. The clock/timer 82 is operable to provide a date and a time of an action or to measure time intervals. For example, the clock/timer 82 can provide a date and a time of an activation or a deactivation of the fitting 10 or the faucet 12 or measure a time interval from an activation of the fitting 10 or the faucet 12 through a deactivation of the fitting 10 or the faucet 12.

Learning System

In an exemplary embodiment, the fitting 10 or the faucet 12 includes a learning system. In an exemplary embodiment, the user input module 44 includes a mechanism to receive from the user numerical value(s) of parameter(s) for the water to be delivered through the discharge outlet 24 of the fitting 10 or the faucet 12 (e.g., a temperature) and a mechanism to deliver to the user the numerical value(s) of the parameter(s) via the water delivered through the discharge outlet 24 of the fitting 10 or the faucet 12. Additionally, in an exemplary embodiment, the processor 50 includes a mechanism to learn a range of the numerical value(s) of the parameter(s) from a minimum value of the parameter to a maximum value of the parameter (e.g., from a lowest achievable temperature to a highest achievable temperature). The processor 50 learns the range of the numerical value(s) of the parameter(s) from the minimum value of the parameter to the maximum value of the parameter (e.g., from the lowest achievable temperature to the highest achievable temperature) through past performance of the fitting 10 or the faucet 12, i.e., by monitoring an actual range of the numerical value(s) of the parameter(s) from the minimum value of the parameter to the maximum value of the parameter (e.g., from a lowest actual temperature to a highest actual temperature) that the fitting 10 or the faucet 12 delivered during past operation of the fitting 10 or the faucet 12.

Generally, in an exemplary embodiment where the user input module 44 receives from the user a desired numerical value of the temperature of water to be delivered through the discharge outlet 24 of the fitting 10 or the faucet 12, the user input module 44 sends a signal to the processor 50 indicating the desired temperature. The processor 50 receives the signal from the user input module 44 and determines whether the desired temperature is achievable. The desired temperature may not be achievable because the cold water supply is not capable of delivering water as cold as the desired temperature or the hot water supply is not capable of delivering water as hot as the desired temperature.

The temperature of water that the fitting 10 or the faucet 12 is capable of delivering will vary depending on multiple factors, some of which are temporary and some of which are permanent. As used herein, temporary means capable of changing within minutes or hours. As used herein, permanent means capable of changing within days, weeks, or months, or not capable of changing.

Exemplary temporary factors include depletion of a hot water tank supplying hot water to the fitting 10 or the faucet 12. For example, the temperature of water that the fitting 10 or the faucet 12 is capable of delivering will be significantly colder if the hot water tank has been depleted. However, the temperature of water that the fitting 10 or the faucet 12 is capable of delivering will quickly increase as hot water is replenished due to heating of water in the hot water tank.

Exemplary permanent factors include a time of year at which the fitting 10 or the faucet 12 is being operated and a geographic location of the fitting 10 or the faucet 12. For example, the temperature of water that the fitting 10 or the faucet 12 is capable of delivering will be colder in the winter than in the summer. However, the temperature of water that the fitting 10 or the faucet 12 is capable of delivering will slowly change as the time of year at which the fitting 10 or the faucet 12 is being operated changes. Similarly, the temperature of water that the fitting 10 or the faucet 12 is capable of delivering will be colder in northern locations than in southern locations. However, the temperature of water that the fitting 10 or the faucet 12 is capable of delivering will not change based on the geographic location of the fitting 10 or the faucet 12 since the geographic location will not change (the temperature of water will, however, change as the time of year changes, even in the same geographic location).

The processor 50 determines whether the desired temperature is achievable by comparing the desired temperature with the lowest achievable temperature and the highest achievable temperature. The lowest achievable temperature and the highest achievable temperature are saved in memory 52. During operation of the fitting 10 or the faucet 12, the temperature sensor 74 detects the temperature of the water being delivered and sends a signal to the processor 50 indicating the detected temperature. The processor 50 receives the signal from the temperature sensor 74 and compares the detected temperature to the lowest achievable temperature and the highest achievable temperature. If the detected temperature is lower than the lowest achievable temperature, the processor 50 saves the detected temperature as the lowest achievable temperature in the memory 52. Similarly, if the detected temperature is higher than the highest achievable temperature, the processor 50 saves the detected temperature as the highest achievable temperature in the memory 52.

In an exemplary embodiment, the processor 50 only compares the detected temperature to the lowest achievable temperature if the handle 22 is in the full cold position and only compares the detected temperature to the highest achievable temperature if the handle 22 is in the full hot position.

In an exemplary embodiment, if the handle 22 is in the full cold position and the detected temperature is lower than the lowest achievable temperature, the processor 50 saves the detected temperature as the lowest achievable temperature.

In an exemplary embodiment, if the handle 22 is in the full cold position and the detected temperature is higher than the lowest achievable temperature, the processor 50 saves the detected temperature as the lowest achievable temperature if the detected temperature has been detected for a certain or predetermined period of time (e.g., two weeks) and/or a certain or predetermined number of times (e.g., twenty times).

In an exemplary embodiment, if the handle 22 is in the full hot position and the detected temperature is higher than the highest achievable temperature, the processor 50 saves the detected temperature as the highest achievable temperature.

In an exemplary embodiment, if the handle 22 is in the full hot position and the detected temperature is lower than the highest achievable temperature, the processor 50 saves the detected temperature as the highest achievable temperature if the detected temperature has been detected for a certain or predetermined period of time (e.g., two weeks) and/or a certain or predetermined number of times (e.g., twenty times).

In exemplary embodiments as described above, reference is made to the handle 22 being in the full cold position and the full hot position. However, one of ordinary skill in the art will appreciate that any electronic input device 62 and/or any manual input device 64 of the user input module 44 could be used to indicate the full cold position or temperature and the full hot position or temperature.

If the processor 50 determines that the desired temperature is not achievable, the processor 50 sends a signal to the user input module 44 with the lowest achievable temperature or the highest achievable temperature. The user input module 44 receives the signal from the processor 50, notifies the user that the desired temperature is not achievable, provides the lowest achievable temperature or the highest achievable temperature to the user, and asks the user if they want the lowest achievable temperature, the highest achievable temperature, or another temperature.

Generally, once the processor 50 has received a desired temperature that is achievable, the processor 50 sends a signal to the electronic valve 32 to activate. As a result, the electronic valve 32 activates and water is delivered through the discharge outlet 24 of the fitting 10 or the faucet 12. The temperature sensor 74 detects the temperature of the water being delivered and sends a signal to the processor 50 indicating the detected temperature. The processor 50 receives the signal from the temperature sensor 74. If the detected temperature is not approximately the same as the desired temperature, the processor 50 sends a signal to the electronic valve 32 to control the temperature of the water being delivered (e.g., decrease or increase the temperature based on whether the detected temperature is above or below the desired temperature). Additionally, if the detected temperature is not approximately the same as the desired temperature, the temperature sensor 74 continues to detect the temperature of the water being delivered and send signals to the processor 50 indicating the detected temperatures, and the processor 50 continues to receive the signals from the temperature sensor 74 and send signals to the electronic valve 32 to control the temperature of the water being delivered, until the detected temperature is approximately the same as the desired temperature.

In an exemplary embodiment, the processor 50 learns an initial lowest achievable temperature and an initial highest achievable temperature during installation of the fitting 10 or the faucet 12.

To learn the initial coldest achievable temperature, the processor 50 sends a signal to the electronic valve 32 to activate and flow all cold water. As a result, the electronic valve 32 activates and all cold water is delivered through the discharge outlet 24 of the fitting 10 or the faucet 12. The temperature sensor 74 detects the temperature of the water being delivered and sends a signal to the processor 50 indicating the detected temperature. The processor 50 receives the signal from the temperature sensor 74. The temperature sensor 74 continues to detect the temperature of the water being delivered and send signals to the processor 50 indicating the detected temperatures, and the processor 50 continues to receive the signals from the temperature sensor 74, until the detected temperature has become stable (e.g., has not changed for thirty seconds). The processor then saves the detected temperature as the initial lowest achievable temperature.

To learn the initial hottest achievable temperature, the processor 50 sends a signal to the electronic valve 32 to activate and flow all hot water. As a result, the electronic valve 32 activates and all hot water is delivered through the discharge outlet 24 of the fitting 10 or the faucet 12. The temperature sensor 74 detects the temperature of the water being delivered and sends a signal to the processor 50 indicating the detected temperature. The processor 50 receives the signal from the temperature sensor 74. The temperature sensor 74 continues to detect the temperature of the water being delivered and send signals to the processor 50 indicating the detected temperatures, and the processor 50 continues to receive the signals from the temperature sensor 74, until the detected temperature has become stable (e.g., has not changed for thirty seconds). The processor 50 then saves the detected temperature as the initial highest achievable temperature.

Reference System

In an exemplary embodiment, the fitting 10 or the faucet 12 includes a reference system. As stated above, in an exemplary embodiment, the user input module 44 includes a mechanism to receive from the user numerical value(s) of parameter(s) for the water to be delivered through the discharge outlet 24 of the fitting 10 or the faucet 12 (e.g., a temperature) and a mechanism to deliver to the user the numerical value(s) of parameter(s) via the water delivered through the discharge outlet 24 of the fitting 10 or the faucet 12. Additionally, in an exemplary embodiment, the user input module 44 includes a mechanism to reference at least some of the numerical value(s) of the parameter(s) (e.g., different temperatures).

Further, in an exemplary embodiment, the processor 50 includes a mechanism to learn references for at least some of the numerical value(s) of the parameter(s) (e.g., different temperatures). The processor 50 learns references for at least some of the numerical value(s) of the parameter(s) through past performance of the fitting 10 or the faucet 12, i.e., by monitoring the numerical value(s) of the parameters(s) (e.g., different temperatures) that the fitting 10 or the faucet 12 delivered during past performance of the fitting 10 or the faucet 12. Moreover, in an exemplary embodiment, the processor 50 includes a mechanism to enable the user to determine which references the processor 50 learns for at least some of the numerical value(s) of the parameter(s) (e.g., different temperatures). The processor 50 learns references for at least some of the numerical value(s) of the parameters through performance of the fitting 10 or the faucet 12 when instructed by the user, i.e., by monitoring the numerical value(s) of the parameter(s) (e.g., different temperatures) that the fitting 10 or the faucet 12 delivered during performance of the fitting 10 or the faucet 12 when instructed by the user.

Generally, in an exemplary embodiment, the user input module 44 displays to the user a range of numerical values of the temperature of water to be delivered through the discharge outlet 24 of the fitting 10 or the faucet 12 together with reference descriptors for at least some of the numerical values of the temperature.

As shown in FIGS. 4a and 4b, in an exemplary embodiment, the user input module 44 displays to the user a sequential list of numerical values of the temperature of water to be delivered through the discharge outlet 24 of the fitting 10 or the faucet 12. FIG. 4a shows an upper end of the sequential list (i.e., from 100° F. to 110° F.), and FIG. 4b shows a lower end of the sequential list (i.e., from 44° F. to 54° F.). A middle portion of the sequential list (i.e., from 55° F. to 99° F.) is not shown in the figures for convenience. However, one of ordinary skill in the art will appreciate that the user input module 44 could display to the user an entire sequential list from the upper end through the lower end.

Additionally, FIG. 4a shows the upper end as 110° F., and FIG. 4b shows the lower end as 44° F. However, one of ordinary skill in the art will appreciate that the upper end could be higher or lower (e.g., 115° F. or 105° F.), and the lower end could be higher or lower (50° F. or 40° F.). In an exemplary embodiment, the upper end is 120° F., and the lower end is 40° F. In an exemplary embodiment, the upper end is 5° F. higher than the highest achievable temperature (as learned by the learning system), and the lower end is 5° F. lower than the lowest achievable temperature (as learned by the learning system).

Further, FIGS. 4a and 4b show the numerical values increasing by 1° F. However, one of ordinary skill in the art will appreciate that the numerical values could increase by more or less than 1° F. (e.g., by 2° F. or 0.5° F.). Moreover, FIGS. 4a and 4b show the numerical values in two lists. However, one of ordinary skill in the art will appreciate that the numerical values could be shown in a single list or more than two lists. Furthermore, FIGS. 4a and 4b show the numerical values displayed in a particular format. However, one of ordinary skill in the art will appreciate that the numerical values could be displayed in a variety of formats.

As also shown in FIGS. 4a and 4b, in an exemplary embodiment, the user input module 44 displays to the user reference descriptors for at least some of the numerical values of the temperature of water to be delivered through the discharge outlet 24 of the fitting 10 or the faucet 12. The exemplary reference descriptors shown in FIG. 4a include "Water Heater Max" for 110° F., "My After-Workout Shower Temp" for 107° F., "Your Last Shower" for 103° F., and "Avg Shower Temp" for 100° F. The exemplary reference descriptors shown in FIG. 4b include "Lowest Summer Temp" for 53° F., "Lowest Recent Temp" for 51° F., and "Lowest Winter Temp" for 45° F.

In an exemplary embodiment, some of the reference descriptors are static. As used herein, static means that no measurements are taken in the home or other environment of the user of the fitting 10 or the faucet 12. In other words, the static reference descriptors are not determined based on use of the fitting 10 or the faucet 12 or any other fitting or faucet in the home or other environment of the user. As shown in FIG. 4a, an exemplary static reference descriptor includes "Avg Shower Temp." This exemplary static reference descriptor can be further described as follows: "Avg Shower Temp" is a predetermined average temperature of water dispensed from showers of a group of people.

In an exemplary embodiment, some of the reference descriptors are dynamic. As used herein, dynamic means that measurements are taken in the home or other environment of the user of the fitting 10 or the faucet 12. In other words, the dynamic reference descriptors are determined based on use of the fitting 10 or the faucet 12 and/or another fitting or faucet in the home or other environment of the user. As shown in FIGS. 4a and 4b, exemplary dynamic reference descriptors include "Water Heater Max," "Your Last Shower," "Lowest Summer Temp," "Lowest Recent Temp," and "Lowest Winter Temp." Each of these exemplary dynamic reference descriptors can be further described as follows: "Water Heater Max" is a highest temperature of water dispensed from a hot water tank in the home or other environment of the user; "Your Last Shower" is a last temperature of water dispensed from the user's shower; "Lowest Summer Temp" is a lowest temperature of water dispensed from any fitting or faucet in the home or other environment of the user during the summer months; "Lowest Recent Temp" is a lowest temperature of water dispensed from any fitting or faucet in the home or other environment of the user during a recent predetermined time period; and "Lowest Winter Temp" is a lowest temperature of water dispensed from any fitting or faucet in the home or other environment of the user during the winter months.

In an exemplary embodiment, some of the reference descriptors are customizable. As used herein, customizable means that measurements are taken in the home or other environment of the user of the fitting 10 or the faucet 12 and the reference descriptor is assigned by the user. In other words, the customizable reference descriptors are determined based on use of the fitting 10 or the faucet 12 and/or another fitting or faucet in the home or other environment of the user and the reference descriptor is determined by the user. As shown in FIG. 4a, an exemplary customizable reference descriptor includes "My After-Workout Shower Temp." This exemplary customizable reference descriptor can be further described as follows: "My After-Workout Shower Temp" is a temperature of water the user wants dispensed from the user's shower after the user's workout.

One of ordinary skill in the art will now appreciate that the present invention provides an electronic plumbing fixture fitting, such as an electronic faucet, including a learning system and a reference system. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. An electronic plumbing fixture fitting, comprising:
a discharge outlet, the discharge outlet operable to deliver water;
an electronic valve, the electronic valve operable to permit flow of water through the discharge outlet when the electronic valve is activated and to not permit flow of water through the discharge outlet when the electronic valve is deactivated, the electronic valve operable to control a parameter of water flowing through the discharge outlet;
a user input module, the user input module operable to communicate with a user regarding a desired value of the parameter of water and an achievable value of the parameter of water;
a water sensor, the water sensor operable to detect a value of the parameter of water; and
a processor, the processor operable to communicate with each of the electronic valve, the user input module, and the water sensor regarding at least one of the desired value of the parameter, the achievable value of the parameter, and the detected value of the parameter;
wherein the processor is operable to send a signal to the electronic valve to activate and flow at least one of a minimum value of the parameter of water and a maximum value of the parameter of water;
wherein the electronic valve is operable to receive the signal from the processor and to activate and flow at least one of the minimum value of the parameter and the maximum value of the parameter;
wherein the water sensor is operable to detect the value of the parameter and to send a signal to the processor indicating the detected value of the parameter; and
wherein the processor is operable to receive the signal from the water sensor indicating the detected value of the parameter and, if the electronic valve is flowing the minimum value of the parameter, the detected value is saved as a lowest achievable value of the parameter, and if the electronic valve is flowing the maximum value of the parameter, the detected value is saved as a highest achievable value of the parameter.

2. The electronic plumbing fixture fitting of claim 1,
wherein the user input module is operable to receive an instruction from the user to deliver water at the desired value of the parameter and to send a signal to the processor indicating the desired value; and
wherein the processor is operable to receive the signal from the user input module indicating the desired value of the parameter and to determine whether the desired value is achievable.

3. The electronic plumbing fixture fitting of claim 2, wherein, if the desired value of the parameter is not achievable:
the processor is operable to send a signal to the user input module indicating the lowest achievable value of the parameter or the highest achievable value of the parameter; and
the user input module is operable to receive the signal from processor indicating the lowest achievable value or the highest achievable value, to notify the user that the desired value is not achievable, and to provide the lowest achievable value or the highest achievable value to the user.

4. The electronic plumbing fixture fitting of claim 1, wherein, during operation of the fitting:
the water sensor is operable to detect the value of the parameter and to send the signal to the processor indicating the detected value of the parameter;
the processor is operable to receive the signal from the water sensor indicating the detected value of the parameter and to compare the detected value to the lowest achievable value of the parameter and the highest achievable value of the parameter;
if the detected value is lower than the lowest achievable value, the processor is operable to save the detected value as the lowest achievable value; and
if the detected value is higher than the highest achievable value, the processor is operable to save the detected value as the highest achievable value.

5. The electronic plumbing fixture fitting of claim 4,
wherein the parameter of water is a temperature of water;
wherein the user input module includes an input device;
wherein the processor only compares the detected value of the parameter to the lowest achievable value of the parameter if the input device is indicating a full cold temperature; and
wherein the processor only compares the detected value of the parameter to the highest achievable value of the parameter if the input device is indicating a full hot temperature.

6. The electronic plumbing fixture fitting of claim 5,
if the detected temperature is higher than the lowest achievable temperature, the processor is operable to save the detected temperature as the lowest achievable temperature if the detected temperature has been detected for at least one of a predetermined period of time and a predetermined number of times; and if the detected temperature is lower than the highest achievable temperature, the processor is operable to save the detected temperature as the highest achievable temperature if the detected temperature has been detected for at least one of a predetermined period of time and a predetermined number of times.

7. An electronic plumbing fixture fitting, comprising:
a discharge outlet, the discharge outlet operable to deliver water;
an electronic valve, the electronic valve operable to permit flow of water through the discharge outlet when the electronic valve is activated and to not permit flow of water through the discharge outlet when the electronic valve is deactivated, the electronic valve operable to control a parameter of water flowing through the discharge outlet;
a user input module, the user input module operable to communicate with a user regarding a desired value of the parameter of water and an achievable value of the parameter of water, the user input module operable to receive instruction from the user regarding the desired value of the parameter;
a water sensor, the water sensor operable to detect a value of the parameter of water; and
a processor, the processor operable to communicate with each of the electronic valve, the user input module, and the water sensor regarding at least one of the desired value of the parameter, the achievable value of the parameter, and the detected value of the parameter;
wherein the processor is operable to send a signal to the electronic valve to activate and flow at least one of a minimum value of the parameter of water and a maximum value of the parameter of water;
wherein the electronic valve is operable to receive the signal from the processor and to activate and flow at least one of the minimum value of the parameter and the maximum value of the parameter;
wherein the water sensor is operable to detect the value of the parameter of water and to send a signal to the processor indicating the detected value of the parameter;
wherein the processor is operable to receive the signal from the water sensor indicating the detected value of the parameter and, if the electronic valve is flowing the minimum value of the parameter, the detected value is saved as the lowest achievable value of the parameter, and if the electronic valve is flowing the maximum value of the parameter, the detected value is saved as the highest achievable value of the parameter;
wherein the user input module is operable to receive an instruction from the user to deliver water at the desired value of the parameter and to send a signal to the processor indicating the desired value;
wherein the processor is operable to receive the signal from the user input module indicating the desired value of the parameter and to determine whether the desired value is achievable;
if the desired value is achievable, the processor is operable to send a signal to the electronic valve to control the parameter of water and the electronic valve is operable to receive the signal from the processor to control the parameter of water and to adjust the parameter of water flowing through the discharge outlet; and if the desired value is not achievable, the processor is operable to send a signal to the user input module indicating the lowest achievable value of the parameter or the highest achievable value of the parameter and the user input module is operable to receive the signal from processor indicating the lowest achievable value or the highest achievable value, to notify the user that the desired value is not achievable, and to provide the lowest achievable value or the highest achievable value to the user.

8. The electronic plumbing fixture fitting of claim 7, wherein, during operation of the fitting:
the water sensor is operable to detect the value of the parameter and to send the signal to the processor indicating the detected value of the parameter;
the processor is operable to receive the signal from the water sensor indicating the detected value of the parameter and to compare the detected value to the lowest achievable value of the parameter; and
if the detected value is lower than the lowest achievable value, the processor is operable to save the detected value as the lowest achievable value.

9. The electronic plumbing fixture fitting of claim 8, wherein the parameter of water is a temperature of water;
wherein the user input module includes an input device; and
wherein the processor only compares the detected temperature to the lowest achievable temperature if the input device is indicating a full cold temperature.

10. The electronic plumbing fixture fitting of claim 9, wherein, if the detected temperature is higher than the lowest achievable temperature, the processor is operable to save the detected temperature as the lowest achievable temperature if the detected temperature has been detected for at least one of a predetermined period of time and a predetermined number of times.

11. The electronic plumbing fixture fitting of claim 7, wherein, during operation of the fitting:
the water sensor is operable to detect the value of the parameter and to send the signal to the processor indicating the detected value of the parameter;
the processor is operable to receive the signal from the water sensor indicating the detected value of the parameter and to compare the detected value to the highest achievable value of the parameter; and
if the detected value is higher than the highest achievable value, the processor is operable to save the detected value as the highest achievable value.

12. The electronic plumbing fixture fitting of claim 11, wherein the parameter of water is a temperature of water;
wherein the user input module includes an input device; and
wherein the processor only compares the detected temperature to the highest achievable temperature if the input device is indicating a full hot temperature.

13. The electronic plumbing fixture fitting of claim 12, wherein, if the detected temperature is lower than the highest achievable temperature, the processor is operable to save the detected temperature as the highest achievable temperature if the detected temperature has been detected for at least one of a predetermined period of time and a predetermined number of times.

14. An electronic plumbing fixture fitting, comprising:
a discharge outlet, the discharge outlet operable to deliver water;
an electronic valve, the electronic valve operable to permit flow of water through the discharge outlet when the electronic valve is activated and to not permit flow of water through the discharge outlet when the electronic valve is deactivated, the electronic valve operable to control a parameter of water flowing through the discharge outlet;

a user input module, the user input module operable to communicate with a user regarding potential values of the parameter of water and a desired value of the parameter of water, the user input module including:
an electronic input device, the electronic input device operable to display to the user the potential values of the parameter and to receive from the user the desired value of the parameter; and a processor, the processor operable to communicate with each of the electronic valve and the electronic input device regarding at least one of the potential values of the parameter and the desired value of the parameter;

wherein the electronic input device is operable to display to the user a range of potential values of the parameter and a reference descriptor for at least one of the potential values of the parameter;

wherein the electronic input device is operable to receive an instruction from the user to deliver water at the desired value of the parameter and to send a signal to the processor indicating the desired value of the parameter;

wherein the processor is operable to receive the signal from the electronic input device indicating the desired value of the parameter and to send a signal to the electronic valve to control the parameter of water;

wherein the electronic valve is operable to receive the signal from the processor to control the parameter of water and to adjust the parameter of water flowing through the discharge outlet;

wherein the reference descriptor is dynamic; and wherein the processor is operable to learn the reference descriptor for at least one of the potential values of the parameter of water through past performance of the fitting.

15. An electronic plumbing fixture fitting, comprising:

a discharge outlet, the discharge outlet operable to deliver water;

an electronic valve, the electronic valve operable to permit flow of water through the discharge outlet when the electronic valve is activated and to not permit flow of water through the discharge outlet when the electronic valve is deactivated, the electronic valve operable to control a parameter of water flowing through the discharge outlet;

a user input module, the user input module operable to communicate with a user regarding potential values of the parameter of water and a desired value of the parameter of water, the user input module including:
an electronic input device, the electronic input device operable to display to the user the potential values of the parameter and to receive from the user the desired value of the parameter; and a processor, the processor operable to communicate with each of the electronic valve and the electronic input device regarding at least one of the potential values of the parameter and the desired value of the parameter;

wherein the electronic input device is operable to display to the user a range of potential values of the parameter and a reference descriptor for at least one of the potential values of the parameter;

wherein the electronic input device is operable to receive an instruction from the user to deliver water at the desired value of the parameter and to send a signal to the processor indicating the desired value of the parameter;

wherein the processor is operable to receive the signal from the electronic input device indicating the desired value of the parameter and to send a signal to the electronic valve to control the parameter of water;

wherein the electronic valve is operable to receive the signal from the processor to control the parameter of water and to adjust the parameter of water flowing through the discharge outlet;

wherein the reference descriptor is customizable; and wherein the processor is operable to learn the reference descriptor for at least one of the potential values of the parameter of water through performance of the fitting when instructed by the user.

* * * * *